United States Patent [19]

Anderson

[11] 3,879,521
[45] Apr. 22, 1975

[54] REMOVAL OF SO₂ FROM FLUE GAS

[75] Inventor: Robert E. Anderson, Sunnyvale, Calif.

[73] Assignee: Diamond Shamrock Corporation, Cleveland, Ohio

[22] Filed: Jan. 2, 1973

[21] Appl. No.: 320,576

[52] U.S. Cl. .............................. 423/242; 423/512
[51] Int. Cl.. C01b 17/00; C01b 17/45; C01b 17/46
[58] Field of Search ........................ 423/242–244, 423/512, 545

[56] References Cited
UNITED STATES PATENTS

| | | | |
|---|---|---|---|
| 1,271,899 | 7/1918 | Howard et al. | 423/512 |
| 1,908,731 | 5/1933 | Clark | 423/242 |
| 3,330,621 | 7/1967 | Vian-Ortuno et al. | 423/545 |

OTHER PUBLICATIONS

Layton et al., Sorption of Sulfur Dioxide by Ion Exchange Resins I&EC Process Design and Development, July 1969, pp. 317–323.

*Primary Examiner*—Edward J. Meros
*Assistant Examiner*—Gregory A. Heller
*Attorney, Agent, or Firm*—Timothy E. Tinkler

[57] ABSTRACT

Sulfur dioxide is removed from flue gas by scrubbing with an alkaline solution, the thus-absorbed sulfur salts being removed with a weak-base ion-exchange resin. On exhaustion, the resin is regenerated with an ammoniacal solution and the effluent treated with lime to precipitate insoluble sulfur salts and free ammonia. The liberated ammonia is then recycled as a resin regenerant.

5 Claims, 1 Drawing Figure

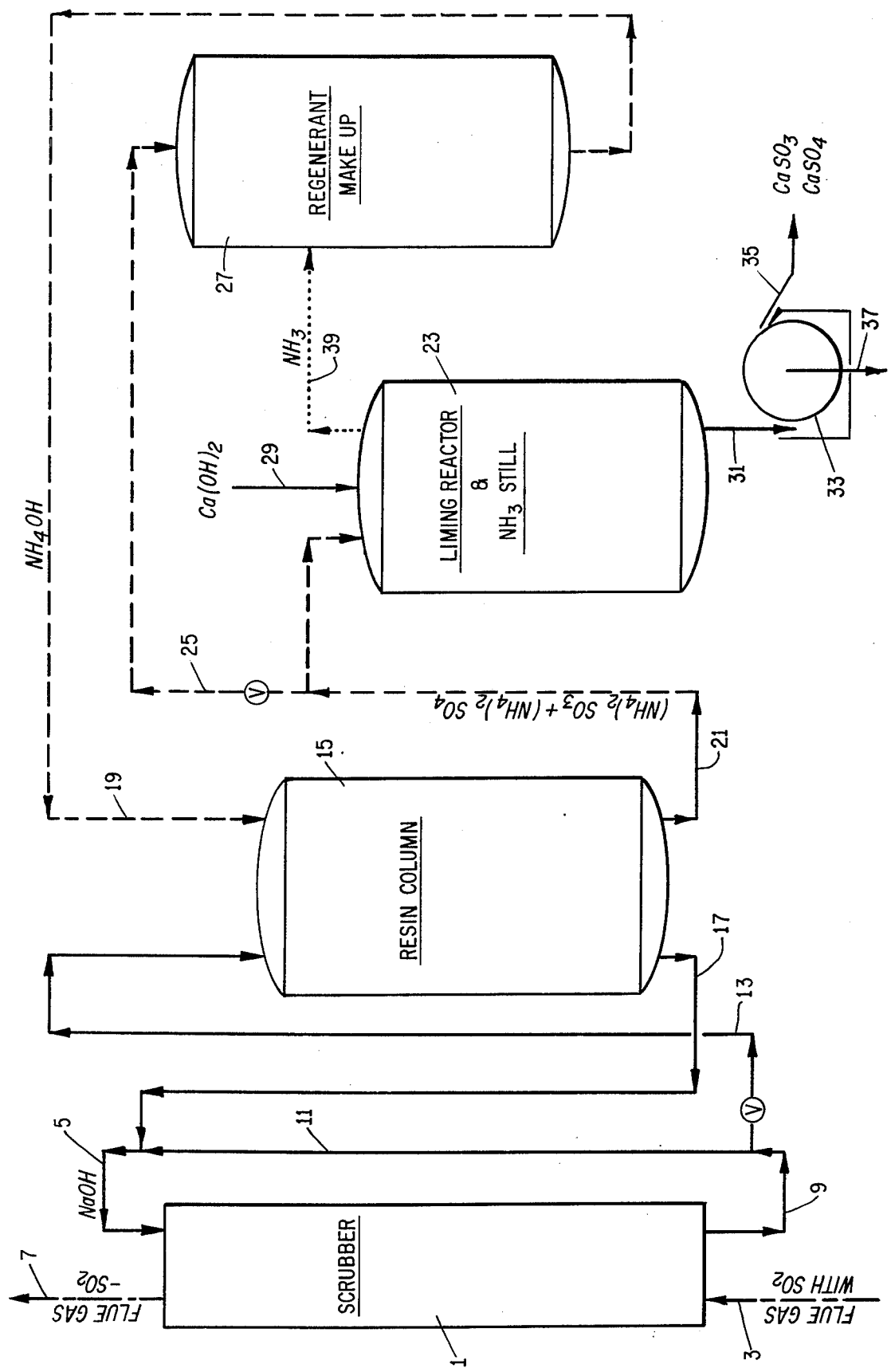

3,879,521

REMOVAL OF SO₂ FROM FLUE GAS

BACKGROUND OF THE INVENTION

Considering the quantities of sulfur-containing coal burned daily, primarily in power generating plants, and the recent and contemplated limitations on the emission of sulfur dioxide into the atmosphere, considerable attention has been directed to means for controlling this emission where sulfur-free coal is not available.

One extremely practical method involves wet scrubbing of the $SO_2$-containing flue gas with an alkaline solution, generally aqueous sodium hydroxide. The spent scrubbing solution, containing a mixture of sodium-sulfur salts, i.e., sodium sulfite, bisulfite, and sulfate, is then treated with lime, thus precipitating the sulfur salts in an insoluble form suitable for use as a sanitary land fill, while at the same time regenerating the scrubbing solution. A particular problem with this process relates to the limited but still significant solubility of calcium salts in the recycled scrubbing solution. In the scrubbing tower, further absorption of sulfur salts leads to the precipitation of insoluble calcium sulfite and hence considerable scaling of the scrubbing equipment necessitating periodic and expensive cleaning operations. Conventional methods of removing calcium from the recycled scrubbing solution, such as by cation-exchange, have not met with success owing to the necessary presence of large amounts of sodium ions in the solution to be treated.

STATEMENT OF THE INVENTION

Therefore, it is an object of the present invention to provide a method for removing $SO_2$ from flue gas by wet alkaline scrubbing while eliminating the precipitation of inert materials within the scrubbing apparatus.

It is a further object of the present invention to provide a method whereby $SO_2$ may be removed from flue gas and converted to a solid form suitable for disposal, which process is capable of maintenance free operation for extended time periods.

These and further objects of the present invention will become apparent to those skilled in the art from the specification and claims which follow.

There has now been found a process for the removal of $SO_2$ from flue gas, which process comprises:

a. continuously contacting a gas containing $SO_2$ with an aqueous alkali metal scrubbing solution;

b. passing at least a portion of the resultant alkali metal sulfite, bisulfite, and sulfate-containing solution through a weak-base ion-exchange resin in the free-base form;

c. returning the effluent having a pH of greater than 7.0 to the contacting step (a);

d. on exhaustion, regenerating the spent resin with an aqueous ammoniacal solution;

e. reacting at least a portion of the resultant ammonium sulfite and sulfate-containing effluent with $Ca(OH)_2$;

f. separating and removing the thus-precipitated calcium salts to waste; and g. recovering the liberated $NH_3$ for recycle as a regenerant to step (d).

Such a process has a number of advantages. The final form that the sulfur salts take is that of insoluble calcium salts, which salts are suitable for disposal as a sanitary land fill. However, contrary to prior processes, calcium is not introduced to the system in such a manner that it may find its way to the actual scrubbing operation, thus causing a scaling problem. The system allows substantially complete recovery and recycle of the various chemicals, thus eliminating the necessity to dispose of liquid waste streams as in other processes.

More specifically, use of a nonvolatile alkali metal ion, especially sodium, as the absorbent has the advantages of high salt solubility and high absorption efficiency, thus allowing use of relatively small absorption equipment. Precipitation from ammonium salt solution with low cost lime allows continual recovery of $NH_3$ as overheads. With sodium salt solutions, the NaOH regenerated suppresses the solubility of $Ca(OH)_2$. Concentrating the regenerant stream by recycle to the ion-exchange step prior to precipitation reduces the quantity of filtrate to be disposed of. Sodium sulfate build-up in the absorbent is reduced by the ion-exchange process, which removes sulfate as well as sulfite. Build-up of soluble sodium sulfate through oxidation has been a problem in processes employing direct liming of the sodium absorbent system.

BRIEF DESCRIPTION OF THE DRAWING

The FIGURE is a schematic representation of the process of the present invention with the solid lines indicating the scrubbing and exchange operations and the broken lines the regeneration and precipitation cycle.

DESCRIPTION OF THE PREFERRED EMBODIMENTS

The wet-scrubbing of $SO_2$ from flue gas with an alkaline solution is not unknown and the variables affecting the operation have been described, for example, by R. J. Phillips in his paper entitled "Sulfur Dioxide Emission Control for Industrial Power Plants" presented at the Second International Lime/Limestone Wet Scrubbing Symposium in November, 1971. With such a process, removal efficiencies in excess of 90 percent are readily obtainable. The method depends upon countercurrent contact of the flue gas stream with an aqueous alkali metal scrubbing solution, generally based on sodium hydroxide solution, although other alkaline materials capable of conversion to water soluble sulfur salts are also useful, e.g., sodium carbonate. Because of its commercial availability and for the sake of convenience, reference will be made hereinafter to scrubbing operations employing sodium hydroxide.

As $SO_2$ is picked up by the caustic, the salt initially formed is sodium sulfite. Since the scrubbing solution is recirculated through the system, the actual working absorbent is the sulfite. $Na_2SO_3 + SO_2 \xrightarrow{H_2O} 2NaHSO_3$. Some sulfate is also formed due to in situ oxidation. As absorption continues, the ratio of bisulfite to sulfite in the solution increases and the pH decreases. Sulfur dioxide removal efficiency remains high down to pH 6.0, with only a minor loss in efficiency when the pH is as low as 5.0. According to the invention, the alkali solution is recycled in the absorber until the pH falls to the range of 5.0 to 6.0. At this time, a portion of the spent alkali solution is withdrawn and passed to a bed of a weak-base anion-exchange resin. Such resins are normally considered to be inoperative in essentially neutral solutions. However, unexpectedly they have been found to exhibit a high capacity for removing sulfite ions from a solution of sodium bisulfite. This converts the solution to a sodium sulfite solution with a pH above 8, which is then recycled to the scrubber. It has also been found that while weak-base resins normally are inert to sodium sulfate solutions, sulfate ion is actually removed in this system, presumably due to the displacement of the less acidic sulfite ions on the resin.

The nature of the weak-base anion-exchange resin employed in the present invention is not critical, except to the extent that it be efficient and chemically resistant to the spent scrubbing solution. Such resins typically contain primary, secondary, and/or tertiary amine groups and may be amine derivatives of chloromethylated polystyrene, condensation products of epichlorohydrin with amines or ammonia, aminated condensation products of phenol and formaldehyde, or modified cross-linked acrylic polymers.

On exhaustion of the resin, that is when the pH of the effluent falls to within the range of 7 to 8, the resin is regenerated. Although any number of basic materials will effect regeneration, ammoniacal solutions are preferred since the ammonia values may be readily recovered for recycle during the subsequent liming operation.

The effluent from the regeneration operation comprises an aqueous solution of ammonium sulfite and sulfate. Since the total concentration of these sulfur salts in the effluent will be low, e.g., on the order of 1 to 2 percent, it is usually desirable to recirculate the solution, with the addition of ammonia as required, until concentrations within the range of 5 to 10 percent are obtained. At this point, or sooner if desired, the effluent containing the stripped sulfur salt values is reacted with hydrated lime, thus precipitating insoluble calcium sulfite and sulfate and at the same time freeing ammonia for recovery, e.g., by distillation. The thus-recovered ammonia is added to the regenerating liquid while the insolubles are filtered off leaving only a small volume of dilute calcium sulfate solution which may be disposed of or recycled to the ammonia still.

More specifically and referring to the attached figure, flue gas containing $SO_2$ and at a temperature of 40° to 90° C enters the scrubber 1 through line 3 generally in an upward direction and counter-current to the downwardly flowing scrubbing solution (temperature 30° to 60° C), introduced through line 5. Gas substantially free of $SO_2$ exits via line 7 and may be vented to the atmosphere. Generally, to insure efficient gas/liquid contact, the scrubber is packed with an inert material or a spray header or similar mechanical device is employed. Scrubbing solution containing increasing amounts of absorbed $SO_2$ exits via line 9 and is recycled through line 11 for introduction to scrubber 1 via line 5. When the scrubbing solution reaches a pH of less than 7, a portion thereof is withdrawn through a valve via line 13 for introduction into the ion-exchange column 15.

In an alternate and preferred embodiment and to insure efficient use of the alkali solution, the scrubber may be divided into two, or preferably three, stages. The solution is recirculated in each stage and forwarded to the next stage on the basis of decreasing pH. The third stage should operate in the pH range above 8.0, the second in the range of 7.0 to 9.0, and the first in the range of 5.0 to 7.0. When the absorbent solution in the third stage falls to a pH of 6.0 or lower, a portion thereof is withdrawn for introduction into the ion-exchange column 15. Means for filtering this solution may be provided to remove any ash or other solids picked up in the scrubber.

The size and configuration of the ion-exchange column will vary according to the size of the absorption operation involved according to considerations known to those skilled in the art. The alkali solution, after contact with the anion-exchange resin, exits the resin column 15 via line 17 at a pH generally within the range of 9 to 12. This alkaline material is then mixed with the scrubbing solution recirculating in line 11 for feed to the scrubber 1. When the resin in column 15 is exhausted, as is indicated by the effluent pH falling to a value of less than 7, flow of the spent scrubbing solution to the resin bed is discontinued to allow stripping of the sulfite and sulfate values and regeneration of the resin. At such time, a second resin bed may be used to maintain continuous operation.

To avoid contamination of the ammonia circuit with alkali metal ions, a brief water wash of the resin bed may be employed. An ammoniacal regenerating solution is then introduced to the resin column 15 via line 19. As indicated earlier, this solution may be ammonium hydroxide or a combination thereof with recirculated ammonium sulfite and sulfate. The amount of ammonia required is approximately stoichiometrically equivalent to the sulfite and sulfate values to be exchanged. The regenerating solution, containing the stripped sulfite and sulfate values, leaves the ion-exchange column 15 via line 21 and either flows directly to the liming reactor ammonia still 23 or is allowed, totally or in part, to flow via line 25 to the regenerant makeup tank 27 from which, after being made once more ammoniacal, it may be recycled through line 19 to the ion-exchange column 15 to effect further stripping.

In the liming reactor and ammonia still 23, hydrated lime is added via line 29, causing the precipitation of calcium sulfite and sulfate that may be drawn off via line 31 to filter 33 whereon a sludge is collected for removal via line 35. The remaining dilute calcium sulfate filtrate may be passed to waste through line 37, since it would be neutral and relatively innocuous. Preferably, it is returned to the liming reactor and ammonia still 23 and an equivalent volume of water removed with the ammonia by distillation. At the same time, the application of heat to the liming reactor and ammonia still 23 drives the liberated ammonia off as a gas that passes via line 39 to the regenerant makeup tank.

It will be apparent from the foregoing that the chemical requirements of the process are limited to hydrated lime and the small amounts of ammonia and caustic required for makeup of losses. It should also be apparent that precipitation of insoluble calcium salts in the scrubber is not possible since the calcium ions are isolated in the liming reactor. Cross contamination of the alkali metal and ammonium streams is prevented by water rinsing of the resin column between the alternate loading and stripping cycles.

In order that those skilled in the art may more readily understand the present invention and certain preferred embodiments by which it may be carried into effect, the following specific examples are afforded.

EXAMPLE 1

A synthetic spent scrubbing solution 0.31 M in $NaHSO_3$, 0.025 M in $Na_2SO_3$ and having a pH of 5.5 is prepared. The solution is passed at a flow rate of 20 ml per minute (equivalent to 0.4 gallon/minute/cubic foot) through a 1 inch diameter column containing 400 milliliters of weak-base resin (Duolite ES-340, trademark of Diamond Shamrock Corporation), prepared by condensing epichlorohydrin and an alkaline polyamine in the form of 20 to 50 mesh spheres. The effluent is sampled periodically and is found to have a pH within the range of 8.8 to 9.2 with a sulfur removal efficiency ranging between 45 and 50 percent. After approximately 1,800 milliliters, the pH drops rapidly to below 7 and sulfur removal likewise falls off. At this time, the column is rinsed with water, regenerated with 120 milliliters of approximately 14 percent $NH_4OH$, and water rinsed again, with the total effluent being collected. Analysis of the effluent shows that 100 percent of the sulfite removed from the synthetic spent scrubbing solution was recovered in the effluent. Addition of approximately stoichiometric amounts of hydrated lime results in the precipitation of calcium sulfite which is readily separated by filtration.

EXAMPLE 2

A second synthetic spent scrubbing solution 0.23 M in $NaHSO_3$, 0.02 M in $Na_2SO_3$, and 0.10 M in $Na_2SO_4$ is prepared ahd has a pH of 5.4. Operating conditions are as in Example 1, except that the weak-base resin (Duolite ES-366) is a modified cross-linked acrylic polymer. The pH of the effluent during loading remained between 10.5 and 11.0 for seven bed volumes, after which it fell sharply to 8. During this time, the total sulfur content of the effluent was 38 to 42 percent of that of the feed. Approximately 30 percent of the sulfite content was removed, and 55 to 65 percent of the sulfate content was removed. On exhaustion, the column is stripped and regenerated with approximately 3 percent $NH_4OH$ with the effluent, including rinses, being collected. Analysis indicates that 100 percent of the sulfur removed from the solution by the column was eluted.

EXAMPLE 3

A flue gas cooled to 130° F and containing 1000 ppm of sulfur dioxide is passed through a three-stage packed-bed cross-flow scrubber at the rate of 2200 cfm. The scrubber contains a plastic packing to a depth of 4 feet. A sodium sulfite-sodium hydroxide solution containing 4 percent dissolved solids and having a pH of 11 is fed to the third stage of the scrubber at an average rate of 3 gallons per minute. The solution is circulated in each of the three stages at a rate of 15 gpm and forwarded to maintain a pH range of 8.5 to 11.0 in the third stage, 7.0 to 9.0 in the second stage, and 5.0 to 7.5 in the first stage. Spent scrubbing solution at pH 5.5 is removed from the first stage at an average rate of 3 gpm. Ninety percent of the sulfur dioxide in this solution is present as sodium bisulfite and 10 percent as sodium sulfite. This solution is diverted via a surge tank to a column containing 10 cu ft of a weak-base ion-exchange resin of the type described in Example 2. The resin bed is 2 ft in diameter and is filled to a depth of 3 ft. The spent scrubbing solution is passed through the column at the rate of 4 gpm. It exits the column at a pH of about 11 and is returned via a surge tank to the third stage of the scrubber. After approximately 1000 gal of spent scrubbing solution have been fed to the column, the pH drops quickly to the range of 7 to 8, at which time the flow to the column is stopped. The spent scrubbing solution remaining in the column is displaced with 50 gal of water and returned to the scrubbing system.

The column is regenerated with 160 gal of a solution containing 2 percent ammonia and 5 percent ammonium sulfite at a flow rate of 3 gal per minute. The first 40 gal of effluent, which consists of the interstitial water in the column, is sewered; the next 50 gal is directed to the regenerant makeup tank; the next 80 gal is directed to the liming reactor and ammonia still; and the next 110 gal is directed to the regenerant makeup tank. The colum is now ready for the next cycle. Fifty pounds of slaked lime is added to the liming reactor with stirring. Calcium sulfite is precipitated and the approximately 20 lb of ammonia released is taken off by heating the slurry to 190° F and readsorbed in the regenerant makeup tank. This returns the regenerant solution to the proper composition for the next run. Small quantities of ammonia are added as needed to compensate for mechanical losses. The calcium sulfite slurry is passed to a filter wheel and washed with 20 gal of water. The resulting cake is 90 lb of calcium sulfite dihydrate suitable for land fill. The filtrate is 100 gal of water containing approximately 0.2 percent by weight of calcium sulfate, the result of in-process oxidation of sulfite ion. This filtrate may be safely sewered.

While the invention has been described by reference to certain particular and preferred embodiments thereof, it is not to be so limited since changes and alterations may be made therein while still remaining within the scope of the appended claims.

I claim:

1. A process for removing $SO_2$ from a gas, which process comprises:
   a contacting a $SO_2$-containing gas with an aqueous alkali metal scrubbing solution;
   b passing the resultant alkali metal bisulfite solution through a weak-base anion-exchange resin;
   c returning the effluent from the resin having a pH greater than 7.0 to the contacting step (a);
   d on exhaustion, regenerating the spent resin with an aqueous ammonia solution;
   e reacting the effluent from the regeneration step with $Ca(OH)_2$;
   f separating the resulting calcium sulfite-containing precipitate; and
   g recovering the liberated $NH_3$ from step (e) for recycle as a regenerant to step (d).

2. A process for removing $SO_2$ from flue gas, which process comprises:
   a. contacting a gas containing $SO_2$ with an aqueous alkali metal scrubbing solution;
   b passing the resultant alkali metal sulfite, bisulfite, and sulfate-containing solution through a weak-base anion-exchange resin;
   c returning the effluent having a pH of greater than 7.0 to the contacting step (a);
   d on exhaustion, regenerating the spent resin with an aqueous ammonia solution;
   e reacting the resultant ammonium sulfite and sulfate-containing effluent with $Ca(OH)_2$;
   f separating and removing the thus-precipitated calcium sulfite and sulfate to waste; and
   g recovering the liberated $NH_3$ for recycle as a regenerant to step (d).

3. A process as in claim 2 wherein the ammonium sulfite and sulfate-containing effluent is rendered ammoniacal and recycled to the regenerating step (d) until an ammonium sulfite/sulfate concentration within the range of 5 to 10 percent is attained.

4. A process as in claim 2 wherein the alkali metal bisulfite-containing solution passed to the resin is at a pH of about 6.0.

5. A process as in claim 2 wherein the scrubbing solution is initially sodium hydroxide.

* * * * *